United States Patent Office 3,389,135
Patented June 18, 1968

3,389,135
PROCESS FOR PREPARATION OF ESTRA-4,9-DIENE-3,17-DIONE AND INTERMEDIATES IN SAID PROCESS
Lewis H. Sarett, Princeton, and Thomas S. Bry, Linden, N.J., John Fried, Palo Alto, Calif., Arthur E. Oberster, North Canton, Ohio, and Roger E. Beyler, Carbondale, Ill., assignors to Merck & Co., Inc., Rahway, N.J., a corporation of New Jersey
No Drawing. Filed Aug. 13, 1965, Ser. No. 497,577
13 Claims. (Cl. 260—239.55)

ABSTRACT OF THE DISCLOSURE

The invention disclosed herein is concerned generally with novel steroid compounds and processes of preparing them. More particularly, it relates to the process for preparing estra-4,9-diene-3,17-dione by reacting 3-hydroxy-estra-1,3,5(10),9(11)-tetraene-17-one with a 2,2-dialkyldioxolane followed by an alkyl or aralkyl iodide thereby forming the corresponding 3-(alkoxy or aralkoxy)-17-ethylenedioxy-estra-1,3,5(10),9(11) - tetraene, converting the latter compound to the 9,11-epoxide by reaction with a peracid, reacting said 9,11-epoxide with an alkali metal in liquid ammonia to produce the corresponding 3-(alkoxy or aralkoxy)-11-hydroxy-17-ethylenedioxy-estra-2,5(10)-diene, reacting the last-named compound with phosphorus oxychloride thereby forming 3-(alkoxy or aralkoxy) - 17 - ethylenedioxy-estra-2,5(10),9(11)-triene, which upon reaction with an aqueous alcoholic solution of a mineral acid, is converted to estra-4,9-diene-3,17-dione. This compound is then converted by reaction with sodium acetylide to 17α-ethynyl-17β-hydroxy-estra-4,9-diene-3-one which was valuable progestational activity.

A typical compound which may be prepared in accordance with this invention may be represented by the formula:

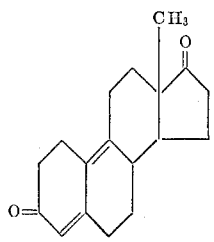

This compound can be converted by known reactions to the corresponding 17α-ethynyl-17β-hydroxy-4,9-estradien-3-one or 17-chloroethynyl-17β-hydroxy-4,9-estradien-3-one both of which are progestationally active. The ethynyl compound for example may be prepared by reaction with a metal acetylide in liquid ammonia, for example an alkali metal or alkaline earth metal acetylide, suitably sodium, potassium or calcium acetylide.

Although this invention will be described as applied to a 17-keto compound, it is not so limited since the 17-position may be unsubstituted or other substitutents may be present provided only that they do not interfere with the course of the reaction.

The above illustrated compounds are prepared from the corresponding 3 - hydroxy - estra - 1,3,5(10),9(11)-tetraene-17-one which may be referred to as 9(11)-estrone in accordance with methods to be discussed hereinbelow.

Certain compounds prepared by the process of this invention are valuable as progestational agents. Others find use as intermediates which may be converted into compounds having progestational activity.

In accordance with the general process of this invention the desired compounds are obtained by the reduction of the aromatic A-ring of the estrone nucleus, in which the 9,11-double bond has been protected, followed by hydrolysis and rearrangement of the double bonds to give the desired estra-4,9-diene system.

In the preferred embodiment of the invention 9(11)-estrone is converted into a corresponding 3-ether-17-ketal. The group at the 3-position may be aralkoxy or lower alkoxy suitably 3-benzyloxy or 3-ethoxy. The ketal at C–17 may be alkylenedioxy, for example, ethylenedioxy. The 3,17-protected-9(11)-estrone is treated with an expoxidizing agent to give the 9(11)-epoxide. Peracids, such as performic, peracetic, perbenzoic or perphthalic acid are especially favored. This 9(11)-epoxide is treated with an alkali metal for example lithium or sodium in liquid ammonia in the presence of a lower alkanol suitably n-butanol or ethanol to give the corresponding 2,5(10)-estradiene-11-ol-3-ether-17-ketal. The 11-hydroxy group is reacted with a dehydrating agent, for example, a phosphorus oxyhalide in the presence of a tertiary amine preferably phosphorus oxychloride in the presence of pyridine to give the estra-2,5(10),9(11)-triene - 3 - ether-17-ketal, which is then hydrolyzed and simultaneously rearranged to give estra-4,9-diene-3,17-dione. This may be effected by treatment with an acid, for example, a mineral acid such as hydrochloric acid.

This 17-keto compound is a valuable intermediate for the preparation of compounds known for their high progestational activity for example 17β-hydroxy-17α-ethynyl-estra-4,9-diene-3-one and 17β-hydroxy-17α-chloroethynyl-estra-4,9-diene-3-one. These 17α-haloethynyl compounds may be prepared for example by the treatment of the corresponding 17-keto steroid with the appropriate ethynyl metal derivative for example an alkali metal acetylide suitably potassium acetylide. An acetylenic Grignard reagent for example an ethynyl or haloethynyl magnesium halide such as ethynyl or chloroethynyl magnesium bromide may also be used.

The process of this invention may be schematically represented as follows:

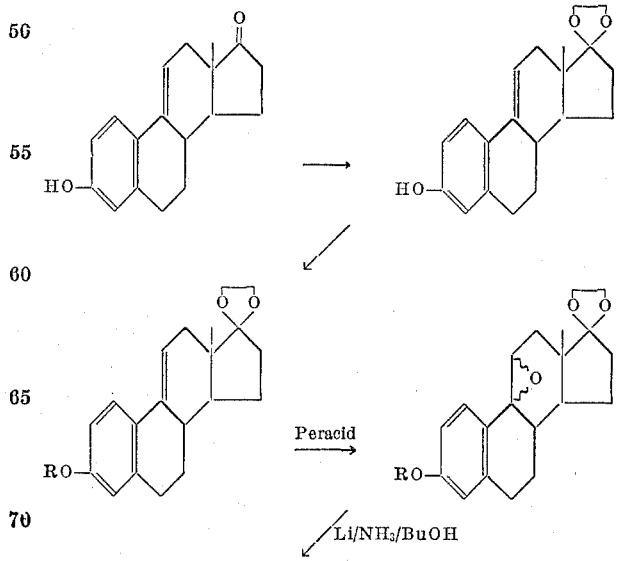

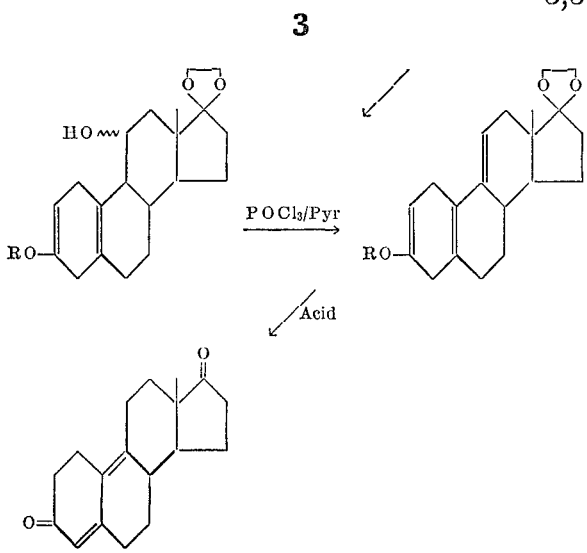

wherein R is alkyl, allyl or aralkyl and ~ at $C_{11}$ indicates an α- or β-configuration.

The 9(11)-estrone used as a starting material in the first step of the process is taken up in a dioxolane such as 2,2-dialkyl dioxolane, suitably 2-ethyl-2-methyl-1,3-dioxolane and heated in the presence of an acid catalyst, for example, a sulfonic acid such as p-toluene sulfonic acid. The liberated alkanone such as butanone together with the solvent is distilled off slowly over a period of from 4–6 hours.

The product may be recovered by any convenient method, for example, the cooled reaction mixture is diluted with a water immiscible hydrocarbon solvent such as benzene, the mixture washed with a dilute aqueous solution of sodium bicarbonate, dried over a drying agent such as anhydrous sodium sulfate, and the solvent removed to give the desired 17-ketal.

To form the 3-ether, the 17-ketal is dissolved in a substantially non-polar oxygenated solvent conveniently acetone and a weak base such as an alkali metal carbonate suitable anhydrous potassium carbonate is added. An alkyl or aralkyl halide such as ethyl iodide, or benzyl iodide is added and the mixture allowed to stand at ambient temperature, for example from about 20° to about 30° C. for a period of from about 12 to about 18 hours, in a stoppered flask. The inorganic material is then removed by filtration and the solvent removed from the filtrate by evaporation to leave the desired product as a residue.

The product may be purified by any convenient method. In the preferred method the residue is taken up in a mixture of water and a water immiscible organic solvent for example ether, benzene or ethyl acetate. The organic layer is washed with water, dried over a drying agent such as anhydrous sodium sulfate, filtered and the solvent removed. Recrystallization of the residue yields substantially pure estra-1,3,5(10),9(11)-tetraene-3-ether-17-ketal.

The 9(11)-estrone-3-ether-17-ketal is taken up in a reaction inert organic solvent such as a hydrocarbon solvent suitably benzene and treated with an epoxidizing agent such as a peracid suitably perbenzoic acid in the same solvent. The reaction mixture is held at from about 0° C. to about 10° C. for from about 5 to about 7 hours.

The product may be recovered by any suitable method. For example, the reaction mixture is washed with cold water containing from about 2% to about 5% by weight of sodium sulfite. The organic layer is separated, dried over a drying agent such as anhydrous sodium sulfate, filtered and the solvent removed from the filtrate to give the crude 9,11-epoxy compound which may if desired be purified chromatographically. It may, for example, be dissolved in methylene chloride and chromatographed on magnesium silicate. The chromatographic column is eluted with petroleum ether containing from about 2% to about 15% by weight of acetone, the removal of the solvent leaves a residue of substantially pure 9-11-epoxy steroid.

The 9,11-epoxy estrone-3-ether-17-ketal, prepared as above, is dissolved in a reaction inert solvent miscible with liquid ammonia such as diethyl ether or dioxane, and the solution added to a previously prepared solution of an alkali metal, suitably lithium or sodium, in liquid ammonia. A lower alkanol for example n-butanol or ethanol is added and the reaction mixture evaporated. The reaction is generally completed in less than 60 minutes and it is rarely necessary to continue the reaction for a longer time. As short a time as 5 minutes is often sufficient. The liquid ammonia is allowed to evaporate at ambient temperature. If desired the evaporation of the liquid ammonia may be hastened by warming the exterior of the reaction vessel to a temperature not higher than about 50° C. A stream of reaction inert gas for example nitrogen may also be passed over the surface of the liquid ammonia in the reaction vessel. This decreases the possibility of side reactions. It is not essential however.

The product may be recovered from the residue by any suitable method. For example the residue is taken up in water and extracted with a water immiscible solvent such as a hydrocarbon or a substantially non-polar oxygenated hydrocarbon suitably benzene, diethyl ether or ethyl acetate. The organic extract is separated, washed with an aqueous solution of sodium bicarbonate, dried over a drying agent such as anhydrous sodium sulfate, filtered, and the solvent removed from the filtrate to give estra-2,5(10)-dien-11-ol-3-ether-17-ketal as a mixture of the 11α- and 11β-epimers which may be separated and isolated chromatographically.

For the preparation of the 9(11)-dehydro compound, the 11-hydroxy compound either as a mixture or as the pure compound is taken up in a tertiary amine preferably pyridine and treated with a phosphorus oxyhalide for example phosphorus oxychloride. The mixture is left standing at ambinet temperature for example from about 20° C. to about 30° C. for from about 12 hours to about 18 hours. The mixture is cooled, held at from about 0° C. to about 5° C. and mixed with an equal volume of water. The desired estra-2,5(10),9(11)-triene crystallizes on standing and is separated by filtration.

The thus prepared estratriene is taken up in a reaction inert organic solvent. A substantially non-polar oxygenated hydrocarbon solvent such as diethyl ether or ethyl acetate may be employed. The mixture is added to an acidic medium such as a solution of a mineral acid in an alkanol suitably anhydrous hydrochloric acid in methanol. The mixture is allowed to stand at from about 20° to about 30° C. for from about 12 to about 18 hours. The product which is an estra-4,9-dien-3-one may be recovered by any convenient mehtod, for example, by the removal of the solvent, preferably in vacuo at a temperature of from about 0° to about 20° C.

The foregoing reaction sequence which has been described in detail, may be defined as a process for the formation of a estra-4,9-dien-3-one from an estra-1,3,5(10), 9(11)-tetraen-3-ether, in which the 9,11-double bond is protected, which is reduced to give the corresponding estra-2,5(10),9(11)-triene followed by removal of the groups protecting the oxygenated functions with simultaneous rearrangement of the double bonds to give the desired estra-4,9-dien-2-one.

EXAMPLE 1

A mixture of 1 g. of 3-hydroxy estra-1,3,5(10),9(11)-tetraen-17-one, 100 mg. of p-toluene sulfonic acid monohydrate and 20 ml. of 2-ethyl-2-methyl-1,3-dioxolane is refluxed for 5 hours while the butanone which forms mixed with the unreacted dioxolane are simultaneously removed by distilling slowly through a small Claisen-Vigreux column at atmospheric pressure. The cooled reaction mixture is diluted with benzene, washed successively with 5% aqueous sodium bicarbonate and with water, dried over sodium sulfate and concentrated to dryness to give the desired product as a residue. It may be purified by crystallization to give substantially pure 17-ethylenedioxy-estra-1,3,5(10),9(11)-tetraen-3-ol.

EXAMPLE 2

To 1 g. of 17-ethylenedioxy-estra-1,3,5(10),9(11)-tetraen-3-ol in 25 ml. of acetone is added 3 g. of anhydrous potassium carbonate. After standing for 15 minutes 1 g. of ethyl iodide is added and the mixture allowed to stand overnight at room temperature in a stoppered flask. The precipitate is then removed by filtration, and the solvent removed from the filtrate by evaporation in vacuo. The residue is taken up in a mixture of ethyl acetate and water, and the water layer discarded. The ethyl acetate extract is washed with water, dried over anhydrous sodium sulfate, filtered and removed by evaporation to leave the desired product as a residue. It may be purified by recrystallization of the residue to yield substantially pure 3-ethoxy-17-ethylenedioxy-estra-1,3,5(10),9(11)-tetraene.

In accordance with the above procedure but using methyl iodide or benzyl iodide in place of ethyl iodide the corresponding 3-benzyloxy or 3-methoxy steroids are obtained.

EXAMPLE 3

18 g. of 3-ethoxy-17-ethylenedioxy-estra-1,3,5(10), 9(11)-tetraene are dissolved in 50 ml. of benzene and cooled to about 10° C. 9.0 g. of perbenzoic acid in benzene is added to the steroid solution, which reaction mixture is held at about 8° C. for 6 hours. The reaction mixture is then washed with cold water containing 5% by weight of sodium sulfite. The benzene solution containing the product is dried over anhydrous sodium sulfate, filtered, and evaporated in vacuo to give the crude 9,11-epoxide. The product may be purified if desired. It may, for example, be dissolved in 50 ml. of methylene chloride and chromatographed over 900 g. of a chromatographic grade of synthetic magnesium silicate. The column is developed with 1000 ml. fractions. The eluent used is petroleum ether containing acetone in increasing proportions of from 2% to 15%. Evaporation of the later fractions yields 3-ethoxy - 17 - ethylenedioxy - 9,11-epoxy-estra-1,3,5(10)-triene.

In accordance with the above procedure but using performic, peracetic or perphthalic acid in place of perbenzoic acid the same product is obtained.

EXAMPLE 4

To a solution of 10 g. of lithium in 1000 ml. of dry liquid ammonia is added a solution of 10 g. of 3-ethoxy-17-ethylenedioxy-9,11-epoxy-estra-1,3,5(10)-triene in 30 ml. of anhydrous diethyl ether and the mixture stirred for 30 minutes. Sufficient n-butanol to discharge the blue color is added to the solution over a period of 20 minutes, after which the ammonia is evaporated, the residue diluted with water and extracted with diethyl ether. The ether extract is washed with water, saturated aqueous sodium bicarbonate solution, dried over sodium sulfate, filtered and evaporated to dryness to give a mixture of the 11α- and 11β-epimers of 3-ethoxy-17-ethylenedioxy-estra-2,5 (10)-dien-11-ol which may be separated chromatographically.

In accordance with the above procedure but using sodium or potassium in place of lithium the same products are obtained.

EXAMPLE 5

10 g. of 3-ethoxy-17-ethylenedioxy-estra-2,5(10)-dien-11α-ol are dissolved in 100 ml. of pyridine and treated with 11 ml. of phosphorus oxychloride. The mixture is allowed to stand at about 25° C. for about 18 hours and water added with ice cooling. An oil is formed which crystallizes on standing and is filtered off and dried to give 3-ethoxy - 17-ethylenedioxy-estra-2,5(10),9(11)-triene. The same product is obtained from the 11β-epimer and from a mixture of both epimers.

EXAMPLE 6

To 500 ml. of a saturated solution of anhydrous hydrogen chloride in anhydrous methanol is added a solution of 5 g. of 3-ethoxy-17-ethylenedioxy-estra-2,5(10),9(11)-triene in 50 ml. of diethyl ether. The reaction mixture is stirred at about 25° C. for 18 hours. The reaction mixture is then evaporated under reduced pressure at 0° C. to give estra-4,9-diene-3,17-dione.

We claim:
1. A process for the preparation of estra-4,9-diene-3,17-dione which comprises reacting a 3-hydroxy-estra-1,3,5 (10),9(11)-tetraen-17-one with a 2,2-bis(lower alkyl)-dioxolane, converting resulting ethylenedioxy compound to a 3-(lower alkyl or lower aralkyl)ether, reacting resulting compound with a peracid selected from the group consisting of peralkanoic acids, perbenzoic acid and perphthalic acid, reacting resulting 9,11-epoxy compound with an alkali metal in liquid ammonia, reacting resulting compound with a phosphorus oxyhalide and reacting resulting 2,5(10),9(11)-estratriene with a mineral acid.

2. A process for the preparation of estra-4,9-diene-3,17-dione which comprises reacting a 3-hydroxy-estra-1,3,5 (10),9(11)-tetraen-17-one with 2-ethyl-2-methyl-1,3-dioxolane, reacting resulting ethylenedioxy compound with ethyl iodide, reacting resulting compound with perbenzoic acid, reacting resulting 9,11-epoxy compound with lithium in liquid ammonia, reacting resulting compound with phosphorus oxychloride and reacting resulting 2,5(10), 9(11)-estratriene with hydrochloric acid.

3. A process for the preparation of estra-4,9-diene-3,17-dione which comprises reacting a 3-hydroxy-estra-1,3,5(10),9(11)-tetraen-17-one with 2-ethyl-2-methyl-1,3-dioxolane, reacting resulting ethylenedioxy compound with benzyl iodide, reacting resulting compound with perbenzoic acid, reacting resulting 9,11-epoxy compound with lithium in liquid ammonia, reacting resulting compound with phosphorus oxychloride and reacting resulting 2,5(10),9(11)-estratriene with hydrochloric acid.

4. A compound selected from the group consisting of 3-lower alkyl ethers and 3-lower aralkyl ethers of 3-hydroxy-9α,11α-epoxy-estra-1,3,5(10)-triene-17-ketal.

5. A compound selected from the group consisting of 3-lower alkyl ethers and 3-lower aralkyl ethers of 3-hydroxy-9β,11β-epoxy-estra-1,3,5(10)-triene-17-ketal.

6. 3-ethoxy-17-ethylenedioxy-9α,11α-epoxy-estra - 1,3,5 (10)-triene.

7. 3-ethoxy-17-ethylenedioxy-9β,11β-epoxy-estra - 1,3,5 (10)-triene.

8. 3-benzyloxy-17-ethylenedioxy - 9α,11α - epoxy-estra-1,3,5(10)-triene.

9. 3-benzyloxy-17-ethylenedioxy - 9β,11β - epoxy-estra-1,3,5(10)-triene.

10. 3-methoxy-17-ethylenedioxy - 9α,11α - epoxy-estra-1,3,5(10)-triene.

11. 3-methoxy-17-ethylenedioxy - 9β,11β - epoxy-estra-1,3,5(10)-triene.

12. 3-ethoxy-17-ethylenedioxy - estra - 2,5(10) - diene-11α-ol.

13. 3-ethoxy-17-ethylenedioxy - estra - 2,5(10) - diene-11β-ol.

No references cited.

LEWIS GOTTS, *Primary Examiner.*